Sept. 16, 1947.  A. H. ANDREWS, JR  2,427,342
METER INDICATOR PHOTOGRAPHIC RECORDING INSTRUMENT
Filed June 8, 1945  2 Sheets-Sheet 1
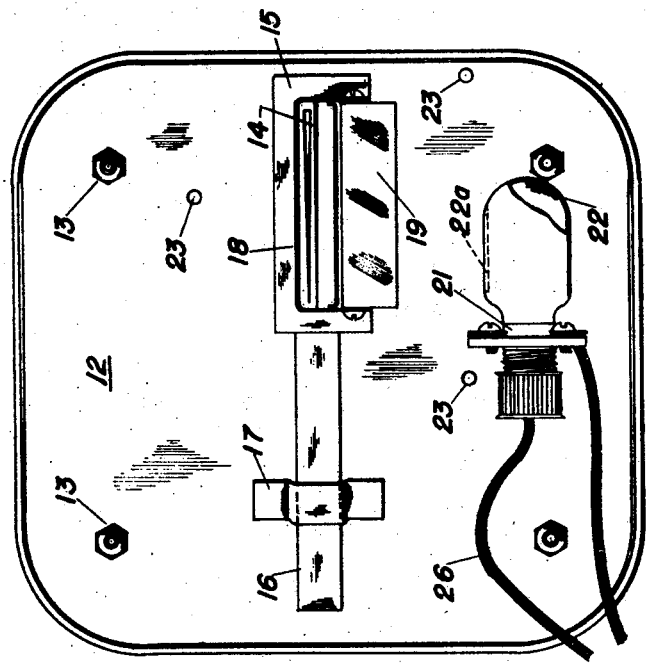
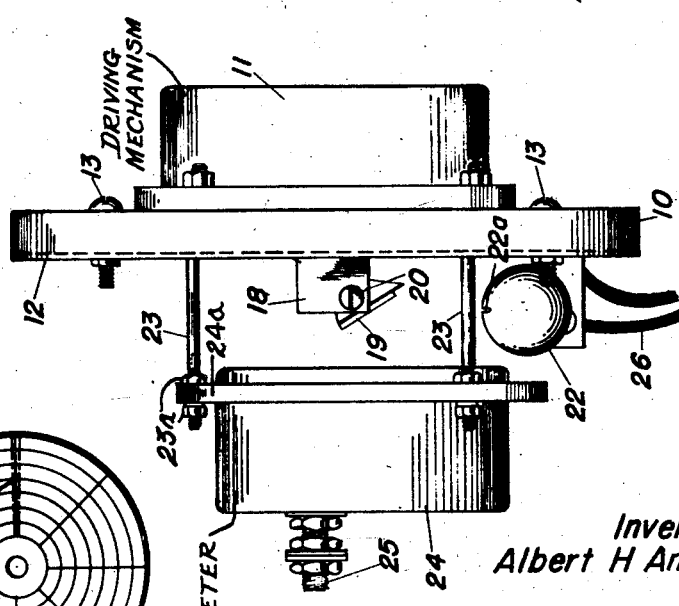
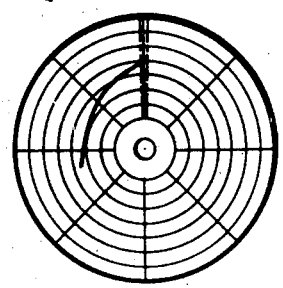
Inventor
Albert H Andrews, Jr
By Ralph L Chappell
Attorney Sept. 16, 1947.   A. H. ANDREWS, JR   2,427,342
METER INDICATOR PHOTOGRAPHIC RECORDING INSTRUMENT
Filed June 8, 1945   2 Sheets—Sheet 2

Inventor
Albert H Andrews, Jr
By Ralph L Chappell
Attorney

Patented Sept. 16, 1947

2,427,342

UNITED STATES PATENT OFFICE 2,427,342

METER INDICATOR PHOTOGRAPHIC RECORDING INSTRUMENT

Albert H. Andrews, Jr., United States Navy

Application June 8, 1945, Serial No. 598,348

2 Claims. (Cl. 234—60)

(Granted under the act of March 3, 1883, as amended April 30, 1928; 370 O. G. 757)

This invention relates to improvements in meter indicator photographic recording instruments.

An object of this invention is to provide a device that will give a continuous time record of meter indications on a light sensitive film and is particularly adapted to make a continuous time record of carbon monoxide concentration as indicated by a hopcalite carbon monoxide indicator.

Indicators to accomplish this result have been designed heretofore but due to their large bulk and weight are not suitable for confined spaces and where load weight must be kept to a minimum, such as in a small aircraft.

A further object of this invention is to provide a device of this character that is compact in size and light in weight, particularly for use in fighter aircraft.

Figure 4:
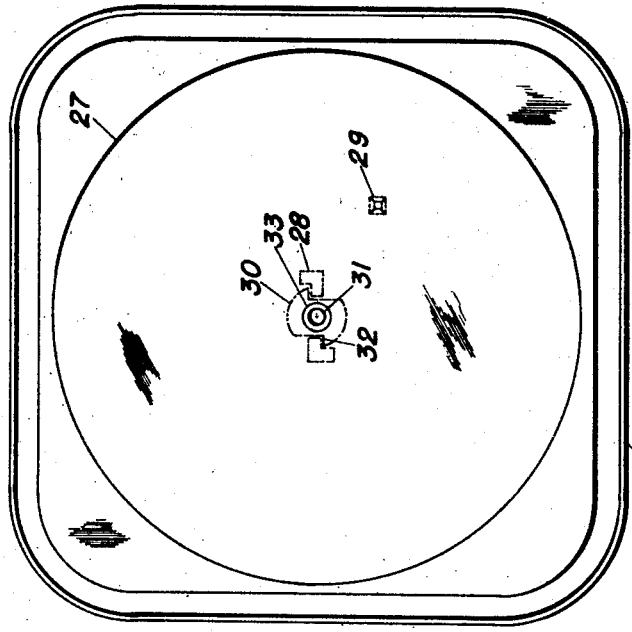
Figure 5:
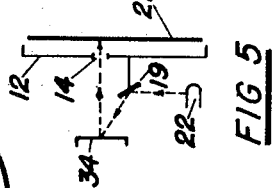
Figure 3:
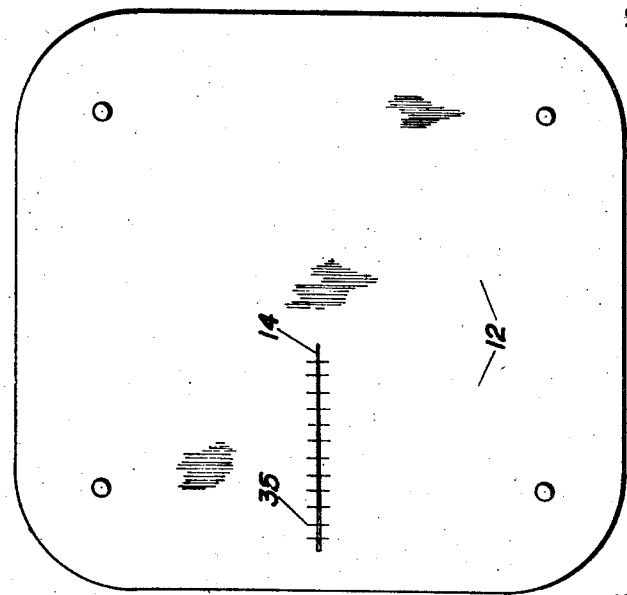

Other objects and advantages of this invention will become apparent as the discussion proceeds and is considered in connection with the claims and accompanying drawings wherein like characters of reference designate like parts in the several views and wherein:

Fig. 1 is a side elevation of the recorder embodied in this invention,

Fig. 2 is a front plan view of the recorder embodied in this invention with the indicating meter removed, Fig. 3 is a plan view of the inside of the front plate showing the light slit as embodied in this invention, Fig. 4 is a plan view of the inside of the film carrying case showing the film disc as embodied in this invention, Fig. 5 is a schematic view of the recorder embodied in this invention, Fig. 6 is a plan view of a sample record produced by the instrument of the present invention.

Referring now to the drawings, wherein for the purpose of illustration, is shown a preferred embodiment of this invention, the numeral 10 designates a case carrying a driving mechanism 11 (details of which are not shown in the drawings). The said driving mechanism may be of any design desired, such as a spring or electrically driven speed controlled motor. Any accurate speed controlled driving mechanism, such as a clock movement, may be used quite satisfactorily, adapting the minute hand shaft as the drive shaft. The case 10 is made light tight and preferably should also be moisture and dust proof. A plate 12 covers the case 10 and is held in place by bolts 13, but may be affixed to the case in any suitable manner such as by clips or clamps. A light slit 14 is provided in the plate 12 of the case as shown in Fig. 2, extending radially from the axis of a circle having its center on the center of the plate 12. The said slit 14 is made narrower at the end adjacent the center or inside and wider at the end adjacent the circumference or outside and preferably should be approximately 0.005 inch at the axis and increasing to 0.010 inch at the circumference end to equalize the time of exposure on film rotating therepast as is hereinafter described. The length of the said slit may vary according to the size of the plate 12, but should be proportioned substantially as shown.

A shutter frame 15 adapted to slidably receive a shutter 16, is provided around the slit 14 as shown in Fig. 2. A U-channel or support 17 slidably carries one end of the shutter 16, as shown. The shutter frame 15 carries a light shield 18 surrounding the slit 14 on three sides. An adjustable mirror 19 is also carried by the frame 15, as shown, the rear side of which makes the fourth side of the light shield. Screws 20 enable the mirror 19 to be held rigidly in place after the mirror is set at the angle desired.

A light source 21 of any conventional type, such as an ordinary lamp bulb, is affixed in any suitable manner to the plate 12 directly below but in a spaced position from the mirror 19. A shade 22 having a light aperture 22a is provided over the lamp and directs a beam of light on to the mirror but at the same time prevents any stray beams of light from escaping to any part of the device other than the mirror. The mirror and light source should be so placed as to prevent light from filtering beyond the mirror and reflecting through the slit 14 and should be placed as close together as practicable for compactness. Supports 23 of any conventional design, in the case of the embodiment shown in this invention, bolts secured to the plate, are provided to carry an indicating meter 24 in a spaced position in front of the mirror 19 and the slit 14. Said bolts are threaded adjacent the ends and pass through a circumferential flange 24a on said meter. The meter is secured in place on each of the bolts by pairs of nuts 23a engaging both sides of the flange 24a, all as clearly shown in Figure 1. In the case of the hopcalite carbon monoxide indicator, the meter is calibrated in per cent carbon monoxide and is electrically connected to the indicator at contact posts 25. Electric current is fed to the lamp 21 by leads 26.

Referring now to Fig. 4 a rigid plate 27 preferably circular in shape is made of any suitable light weight material, such as Lucite or other plastic, and is adapted to carry a light sensitive film paper (not shown) carried upon the face of the said disc 27 adjacent the inside of the plate 12, located as close to the said plate 12 as possible without touching the same. The said film may be affixed to the circular disc 27 in any suitable manner. It has been found that several small pieces of adhesive are quite satisfactory for holding the paper in place. On the reverse or rear side of the disc are located dogs 28 near the center adapted for removable engagement with the driving mechanism. The disc 27 is adapted to be slidably removed from the driving mechanism and is held in place by the case cover.

The driving mechanism, as used in the preferred embodiment of this invention, is a spring driven clock movement and is wound by a winding shaft 29. It is provided with a circular driving member 30 rigidly affixed to a drive shaft 31 attached to the minute hand shaft of the clock mechanism, and is provided with two gripping slots 32 cut in the circumference adapted for engagement with the dogs 28 of the rotating disc as shown. A hole 33, in the center of the disc 27 engages the shaft 31 and holds the said plate in position.

In operation the light sensitive film is affixed to the disc 27, the case 10 is closed by the plate 12 which is held in place by the screws 13 and the instrument is carried on any suitable base such as the dashboard or cowling of the cockpit of an aircraft (not shown). The clock mechanism is wound before the case is closed and the disc 27 carrying the light sensitive film is rotated at a definite speed, in the case of the embodiment shown in this invention, one complete revolution per hour. Light is reflected from the lamp 21 to the mirror 19 and then to the needle 34 of the meter 24. The needle 34 is preferably provided with some reflecting material but may be of a highly polished metal. Light is reflected from the said needle back to the slit 14 and passes through the slit on to the light sensitive paper where it is recorded. As illustrated in Fig. 6, the film preferably should be calibrated so that relative positions of the needle may be read at any definite time or time interval. Time is indicated by the angle of rotation of the film and the meter reading is indicated along the radii of the film.

Fine gauge wire 35 may be affixed across the slit, as shown only in Fig. 3, to produce calibration marks on the film. The wires 35 may be welded, soldered or otherwise suitably secured to the plate 12 across the slit.

It is to be understood that the form of this invention, herewith shown and described, is to be taken as a preferred example of the same, and that various changes in the shape, size, and arrangement of parts may be resorted to, without departing from the spirit of this invention or the scope of the subjoined claims.

The invention described herein may be manufactured and used by or for the Government of the United States of America for governmental purposes without the payment of any royalties thereon or therefor.

What I claim is:

1. A photographic recording instrument of the type described comprising a case, a disc adapted to carry a light sensitive film in said case, means to rotate the said disc, a plate covering the said case having a light slit adjacent the said disc, a rectangular mirror affixed to the outside of the said plate adjacent the said slit, a light source directing a beam of light to the said mirror, means to shield light from the said slit, and indicating means supported on said case in spaced relation from said plate to receive light from the said mirror and reflect it through the said slit to a sensitized film carried upon the said disc.

2. A photographic recording instrument comprising a case, a disc adapted to carry a light sensitive film rotatably mounted in said case, means to rotate said disc at a predetermined rate, a plate covering said case and having a radial slit adjacent said disc, means shielding said slit from light rays, said shielding means including a mirror mounted obliquely with respect to the plane of said plate and having its reflecting surface directed outwardly from said plate, a light source mounted on said plate for producing a relatively thin beam of light directed at the reflecting surface of said mirror, a meter having a reflecting pointer, and means securing said meter to said plate in spaced relation thereto with said pointer adapted to travel across a path opposite said slit, the beam of light from said light source being adapted to travel to the reflecting surface of said mirror, thence to the pointer, and thence to the slit, whereby the position of said pointer may be continuously recorded.

ALBERT H. ANDREWS, Jr.

REFERENCES CITED

The following references are of record in the file of this patent:

UNITED STATES PATENTS

| Number | Name | Date |
| --- | --- | --- |
| Re. 14,821 | Chubb | Mar. 23, 1920 |
| 653,881 | Pollak | July 17, 1900 |
| 1,779,324 | Long | Oct. 21, 1930 |
| 1,907,105 | Haworth | May 2, 1933 |